United States Patent [19]
Corey et al.

[11] Patent Number: 5,694,011
[45] Date of Patent: Dec. 2, 1997

[54] WINDSHIELD WIPER CONTROL WITH STALL PROTECTION

[75] Inventors: Lawrence G. Corey, Smithfield, N.C.; Helmut Guehr, Marysville, Ohio

[73] Assignee: Eaton Corporation, Cleveland, Ohio

[21] Appl. No.: 637,954

[22] Filed: Apr. 25, 1996

[51] Int. Cl.$^6$ ............................................ H02P 1/04
[52] U.S. Cl. ..................... 318/444; 318/443; 318/280; 318/483; 318/445; 15/250
[58] Field of Search ........................... 318/483, 443, 318/444, DIG. 2, 445, 280; 15/250, 250.17

[56] References Cited

U.S. PATENT DOCUMENTS 4,542,325  9/1985  Kobayashi et al. .................... 318/483
5,075,519  12/1991  Hayakawa ......................... 318/445 X
5,525,879  6/1996  Wainwright ......................... 318/443

*Primary Examiner*—Karen Masih
*Attorney, Agent, or Firm*—Quarles & Brady

[57] ABSTRACT

A windshield wiper control detects a stall condition of the windshield wiper motor such as may be caused by a freezing of wiper blades to the windshield by monitoring the commutating switch normally used to park the windshield wiper blades when the wipers are turned off. Failure of the signal from the switch to change indicates the motor has stalled and causes a timer holding a value greater than a wiper cycle to time out and de-energize the wiper motor. The wiper motor is re-energized by turning off then on again the wiper control. A method of setting the interval between intermittent operation of the wiper with a single switch, times from previous wiper cycles to the switch activation to set a longer or shorter wiper cycle interval.

15 Claims, 5 Drawing Sheets

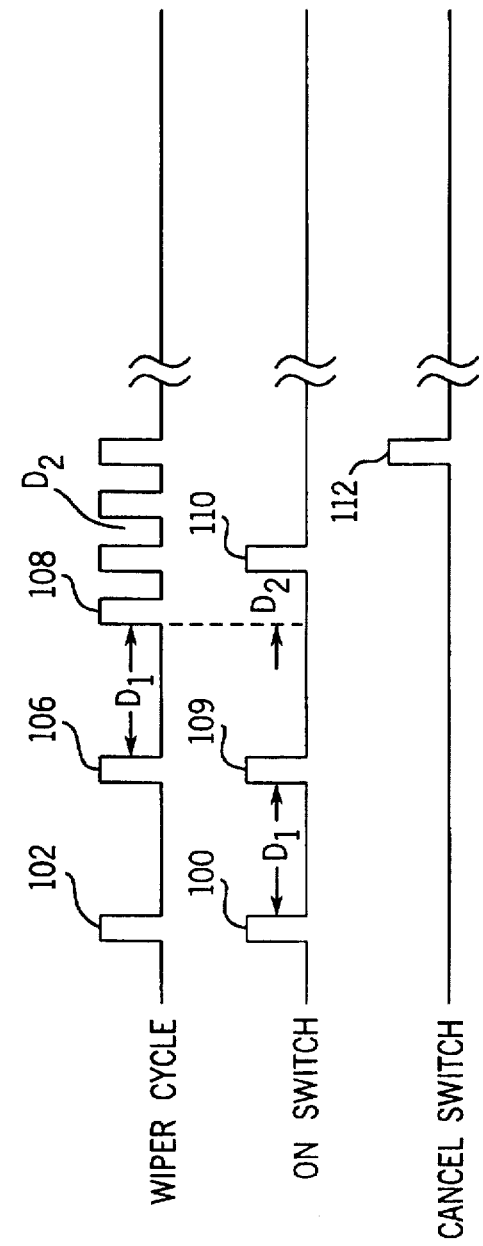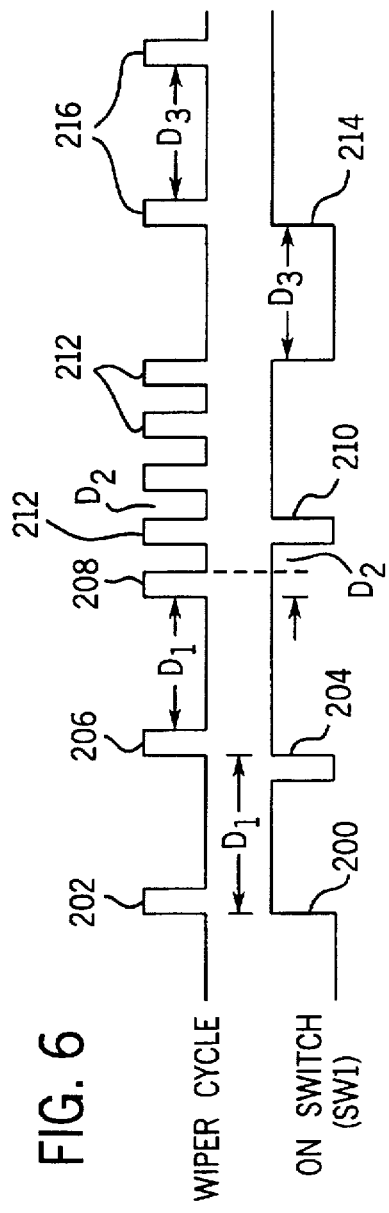

WINDSHIELD WIPER CONTROL WITH STALL PROTECTION

FIELD OF THE INVENTION

The invention relates to electronic controls for windshield wipers and in particular to a control that protects against damage to the windshield wiper mechanism and motor, and possible injury to the driver, when the windshield wiper blades are frozen against the windshield.

BACKGROUND OF THE INVENTION

A windshield wiper mechanism for a truck or the like includes an arm pivoted at one end, and at the other end, supporting a rubber blade or squeegee against the windshield surface. The pivot of the arm is attached to a reciprocating linkage driven by a multiple speed electric motor that may be activated by a wiper switch within the cab of the vehicle. When the motor is run, the rubber blade sweeps back and forth over the surface of the windshield removing water and dirt. For this latter operation, the windshield wiper mechanism may be assisted by an electrically driven washer fluid pump which sprays washer fluid on the windshield as the blade is moved.

When the windshield wiper is turned off, it is desirable that the blade be "parked" in a position near the edge of the windshield so as not to obstruct the driver's view. For this purpose, a continuously rotatable switch may be attached to the motor having contacts that are closed except when the blade is in the parked position. This switch is wired in parallel with the wiper switch so that when the wiper switch is turned off (by opening its contacts) the rotary switch shunts this control continuing to provide power to the motor until the parked position is reached. At this point the rotary switch contacts open and the motor stops.

It is possible to unintentionally defeat the operation of the rotary switch in parking the wiper blades, if the ignition to the vehicle is turned off prior to the windshield wiper blades reaching the parked position. Under these circumstances, when the ignition is again turned on, the windshield wiper will be activated for a brief period as it tries to complete its return to the parked position. Such an inadvertent activation of the windshield wiper motor, when the ignition is first switched on, is particularly troublesome in cold weather. At such times, the windshield wiper blades will often have frozen to the window while the ignition was off, for example, overnight. If the ignition is started the next morning prior to a proper releasing of the windshield wiper blades from the window, the windshield wiper motor will be unable to move.

In such a stalled condition, the electric motor consumes large currents and can quickly overheat. The torque of the motor can also apply damaging stress to the drive gears and linkage connecting the motor to the wiper arm. Further, if the wiper blade is then released by the driver it may strike the driver with the force of the stored torque.

To avoid damage to the motor and linkage under such conditions, it is known to wire the motor in series with a thermally activated bi-metallic switch that will open in response to heat generated by the excess current drawn by the stalled motor. When this bi-metallic switch opens, the circuit to the motor is broken, de-energizing the motor and the switch. This in turn causes the switch to cool and reconnect the motor without warning. If the wiper blades are not released, the motor will be repeatedly activated and deactivated repeatedly stressing the motor and linkages.

In some circumstances the motor may be stalled for a considerable period of time especially with large trucks which are often warmed up for an extended period of time while the operator attends to other matters. During the warm-up the bi-metallic switch may cycle many times through an open and closed state causing considerable wear on the linkage and motor both in excess heating and repetitively applied high torques. The making and breaking of the bi-metallic contact can also lead to its premature failure. In even short periods of engine warm-up when the operator attends to releasing the windshield wiper blade from the window if the motor is activated the blades may strike and injure the operator.

SUMMARY OF THE INVENTION

The present invention provides a simple electronic control of a windshield wiper that significantly reduces the possibility of operator injury and damage to the windshield wiper motor and linkage when the windshield wiper motor is stalled as a result of wiper blades freezing to the windshield. Generally, the circuit monitors motion of the windshield wiper, and, if no motion is detected, deactivates the motor after a short period of time somewhat longer than the longest expected cycle of the windshield wiper in normal operation. The motor is reactivated when the wipers are turned off then on again.

Specifically, the invention provides a windshield wiper control for use with a windshield wiper system having a wiper motor, a sensor communicating with the motor providing a wiper motion signal, and a wiper switch. The control provides an electronic circuit connected to the motor sensor and switch which can switchably supply electric power to the motor. The circuit monitors the wiper motion signal and removes electrical power from the motor either when the wiper-on signal is no longer present or when the wiper-on signal is present but the wiper motion signal is no longer present.

Thus it is one object of the invention to reduce the wear on the windshield wiper mechanism and the possibility of operator injury in situations where the wiper motor is energized but stalled because the wiper blade is frozen to the windshield.

The sensor may be the rotary switch attached to the wiper motor providing a set of contacts opening and closing with rotation of the wiper motor to provide a high and low voltage signal as the motion signal.

Thus, it is another object of the invention to provide a windshield wiper controller with the above described features that is compatible with a conventional windshield wiper assembly having a commutator switch. The opening and closing of the commutator switch, normally used to park the windshield wiper blade, may be used to deduce motion of the windshield wiper motor.

The electric circuit may also restore electrical power to the motor, after it has been removed because of a stall condition, when the wiper-on signal is removed then reasserted.

Thus it is another object of the invention to provide an intuitive method of reactivating the windshield wiper after it has been deactivated by the electronic circuit, that method eliminating the need for separate reset buttons or special instructions to the driver. When the windshield wiper does not work but has been mechanically freed, it is intuitive to try switching the wiper switch once. This operation will then reactivate the windshield wiper.

The power may be removed from the motor only after the wiper motion signal is no longer present for a predetermined period of time selected to be greater than the period of the wiper cycle but less than the amount of time that would be expected to cause damage to a motor in a stalled condition. The time may also be selected to be less than the expected period of time required for an operator to move from the cab of the vehicle, after turning on the ignition, to the front of the vehicle to clear the windshield wiper blades.

Thus it is another object of the invention to reduce possible operator injury when the blades are stuck to the windshield with the motor activated.

The electronic circuit may also remove electrical power from the motor only when the wiper-on signal is no longer present after the wiper signal is in the first "parked" position. The electronic circuit may also periodically remove and restore power from and to the motor to operate the wiper on an intermittent basis.

It is thus another object of the invention to provide the above described features in a manner compatible with the convention park and intermittent cycle modes of windshield wiper systems.

The foregoing and other objects and advantages of the invention will appear from the following description. In this description, references made to the accompanying drawing which form a part hereof and in which there is shown by way of illustration the preferred embodiment of the invention. Such embodiment does not necessarily represent the full scope of the invention, however, and reference must be made therefore to the claims for interpreting the scope of the invention.

BRIEF DESCRIPTION OF THE DRAWINGS

FIG. 5 is a timing diagram showing operation of the wipers in response to switch inputs according to a prior art system in which it is difficult to increase the delay between successive wiper cycles;

FIG. 6 is a timing diagram of the embodiment of FIG. 4 in which the delay between wiper cycles may be easily increased or decreased.

DETAILED DESCRIPTION OF THE PREFERRED EMBODIMENTS

Wiper Mechanism and Controller Hardware

Figure 1:
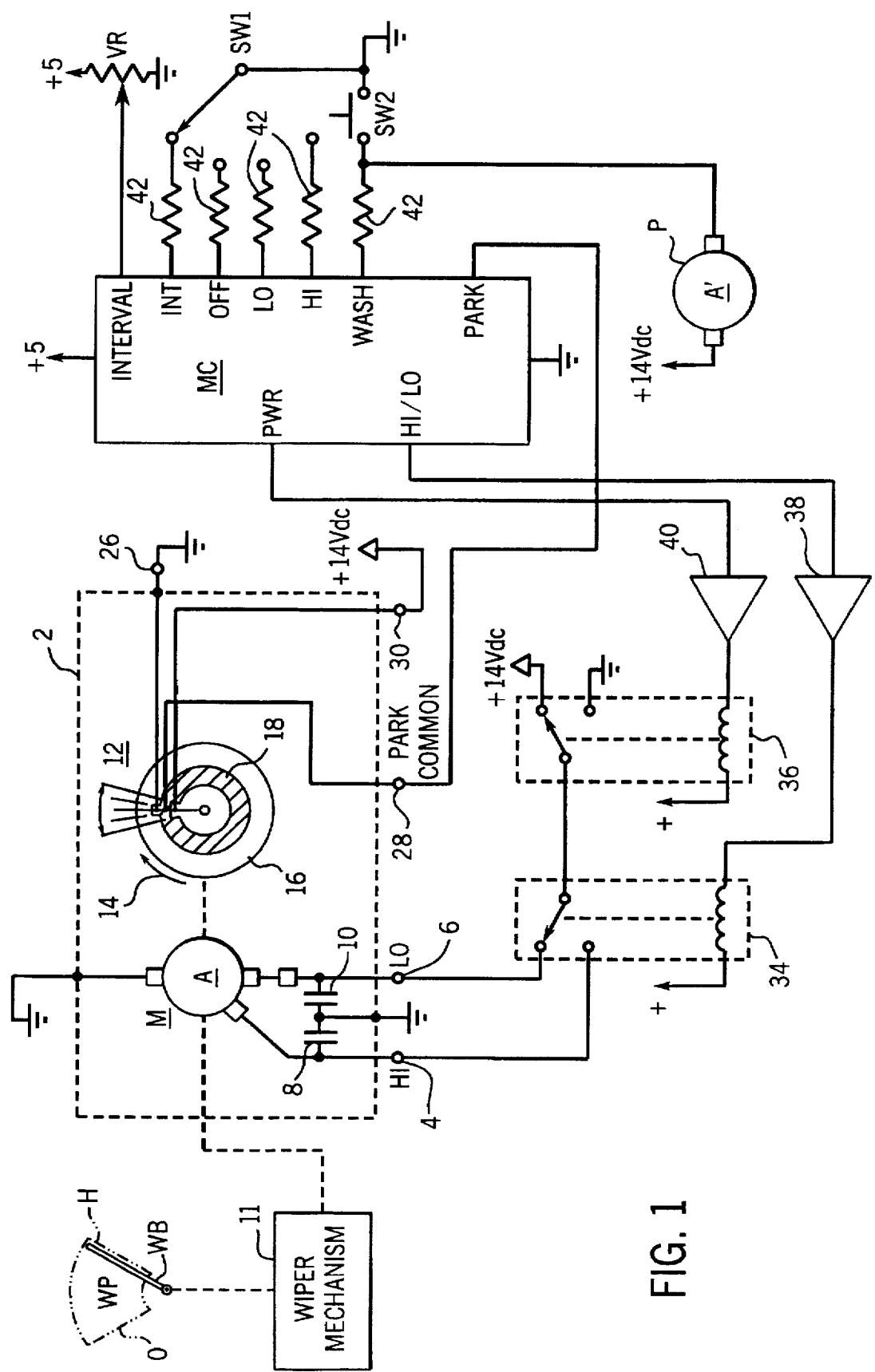
FIG. 1 is a schematic block diagram of a windshield wiper control system of the present invention showing a conventional motor and commutator switch as connected to a microcontroller.

Referring to FIG. 1, a windshield wiper control system presently in use for heavy duty vehicles includes a wiper motor assembly 2 comprising a motor M having an armature A and a high and low speed winding connected to terminals 4 and 6 respectively. A pair of filter elements such as capacitors 8 and 10 are connected between the high and low speed windings, and their junction is connected to ground to provide an electromagnetic interference filter for the motor assembly.

Figure 2:
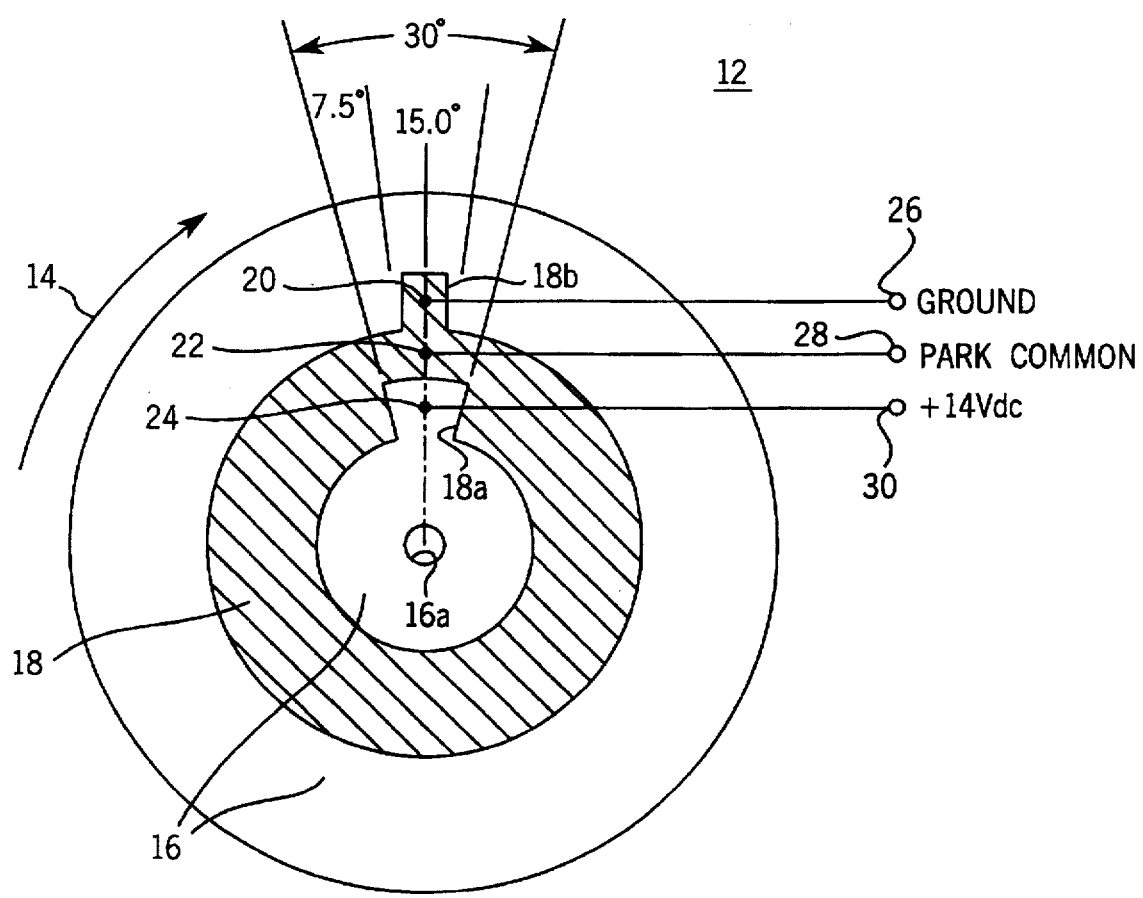
FIG. 2 is a detailed schematic representation of the commutator switch of FIG. 1.

The housing of the motor assembly 2 is represented by a dotted rectangle and is connected to ground in the control system. Armature A is connected through a geared down output of motor assembly 2 within the housing of the motor assembly to a windshield wiper mechanism 11 having a wiper blade WB attached. Wiper blade WB is operable through a wipe cycle from a home position H of the wiper blade to an opposite extreme position O of a wipe pattern WP and back to the home position H during, for example a 360 degree rotation of the geared down output. A commutator type rotary switch 12 is mounted within the housing of the motor assembly 2 as an integral part of the motor assembly. Switch 12 is driven by armature A through a geared down output of the motor assembly 2 for rotation in the direction of arrow 14. Switch 12 is shown separately and to an enlarged scale in FIG. 2. Switch 12 comprises an insulating disk 16 having a center opening 16A for attachment to the geared down output of motor assembly 2. A conductive commutator ring 18 is affixed to the face of the disk 16. Commutator ring 18 has a notch 18A formed therein adjacent its inner diameter and a projecting tab 18B on the outer diameter radially aligned with the notch 18A. Notch 18A has an arcuate width of 30 degrees whereas the width of tab 18B is 15 degrees at the base of the tab adjacent to the outer diameter of ring 18. Three stationary wiper contacts 20, 22 and 24 are mounted within the housing of the motor assembly 2 to be positioned relative to commutator ring 18 as shown in FIG. 2.

Contact 20 is radially aligned with tab 18B and is connected to a ground terminal 26 of the motor assembly 2. Wiper contact 22 is radially aligned with the commutator ring 18 to be in continuous contact with that ring and is connected to a park common terminal 28 of the motor assembly 2. Stationary wiper contact 24 is aligned radially with the notch 18A and is connected to a power supply terminal 30 of the motor assembly 2.

When the disk 16 rotates in the direction of arrow 14, the park common wiper contact 22 is in continuous engagement with the commutator ring 18. When connected as shown in FIG. 1, the park common contact bridges to the ground contact 20 through commutator ring 18 for 15 degrees of rotary motion of commutator ring 18, is then open for 7.5 degrees of travel, then bridges to the power supply wiper contact 24 for 330 degrees rotation, followed by disconnection for 7.5 degrees and finally reconnection to ground. During the above described rotation, the wiper mechanism 11 has caused the wiper blade WB to travel from the home position H of wipe pattern WP to the opposite extreme position O of the wipe pattern and back to the home position H for a complete wipe cycle of the wiper blade.

Referring again to FIG. 1 terminals 4 and 6 of the high and low speed windings of the armature A are connected to two separate throw terminals of a single-pole, double-throw relay 34. A pole terminal of this relay is in turn connected to a pole terminal of a single-pole, double-throw relay 36. One throw terminal of that relay 36 is in turn connected to 14 volt DC power supply and the other throw terminal is connected to ground. Thus, a closing of the contacts of relay 36 provides power to either the low or high speed winding of the motor M depending on the position of the pole of relay 34.

The coil of relay 34 is attached to amplifier 38 which provides sufficient current to activate the relay 34 from a low powered HI/LO signal from a microcontroller MC. The amplifier 38 may be, for example, a single transistor such as is well understood in the art. The relay coil for relay 36 is also driven by an amplifier 40 which receives a power PWR signal from the microcontroller MC.

Thus, signals generated by the microcontroller MC may control both the energizing of motor M and whether it is operated in the high or low speed range.

The microcontroller MC may be any one of a number of commercially available single chip microcontrollers having onboard nonvolatile memory for storing a program to operate the microcontroller and having at least two binary outputs suitable for providing the PWR and HI/LO signals above described.

The microcontroller must also provide at least one analog input and six binary inputs.

Four of the binary inputs are connected through protection resistors 42 to one of four throw terminals of single-pole four-throw rotary switch SW1. The pole of SW1 is connected to ground and each of these inputs has an internal pull up resistor such as is known in the art so that depending on the position of the pole of SW1 one of the inputs will be pulled to ground and the others will be pulled by the internal pull up resistor to the supply voltage of 5 volts of the microcontroller MC.

The four binary inputs connected to SW1 are used as follows: One input provides an INT input to the microcontroller MC indicating that the user wishes to operate the windshield wiper system in intermittent mode. One input provides an OFF input which indicates that the user wishes to turn the windshield wiper off. A HI input indicates that the user wishes to operate the windshield wiper mechanism at high speed and the LO input indicates the user wishes to operate the wiper system in a low speed mode.

A remaining one of the binary inputs provides the WASH input and is connected through a protection resistor 42 to a throw terminal of a momentary contact normally open switch SW2 also connected to ground. When the WASH input is closed it imposes a low voltage on the WASH input of the microcontroller MP signaling that the user wishes to wash the windshield as well as activate the windshield wiper.

A sixth binary input to the microcontroller is a PARK signal received from the park common terminal 28 and indicating when the commuter switch 12 is open and thus when the wiper mechanism is at the home position H or elsewhere in its cycle. When it is desired to park, the wiper relay 36 is switched to connect terminal 4 or 6 of the armature to ground to provide dynamic breaking of motor M.

The throw terminal of SW2 is also connected to one terminal of armature A' of a pump P whose other terminal is connected to the 14 volt power supply. Thus, when SW2 is closed, the pump P is activated pumping a windshield cleaning solution onto the windshield such as is well known in the art.

Microcontroller MC also includes one analog input receiving an INTERVAL signal and connected to a voltage divider formed of a variable resistor VR. The user by dialing a knob on the variable resistor provides a different voltage between the power supply of 5 volts of the microcontroller MC and ground indicating the duration of the interval desired when the wiper system is operated in intermittent mode. The INTERVAL input converts the analog voltage level from the variable resistor VR into a digital value (using an A to D converter) which may be read by the microcontroller operating according to its stored program.

Switches SW1 and SW2 and variable resistor VR are positioned within the cab to be accessible to the user for control of the wiper mechanism.

Microcontrollers MC suitable for use in this application are readily available commercially and may be, for example model PIC16C71 available for example from Microchip Corporation.

Motor Stall Protection Program

Figure 3:
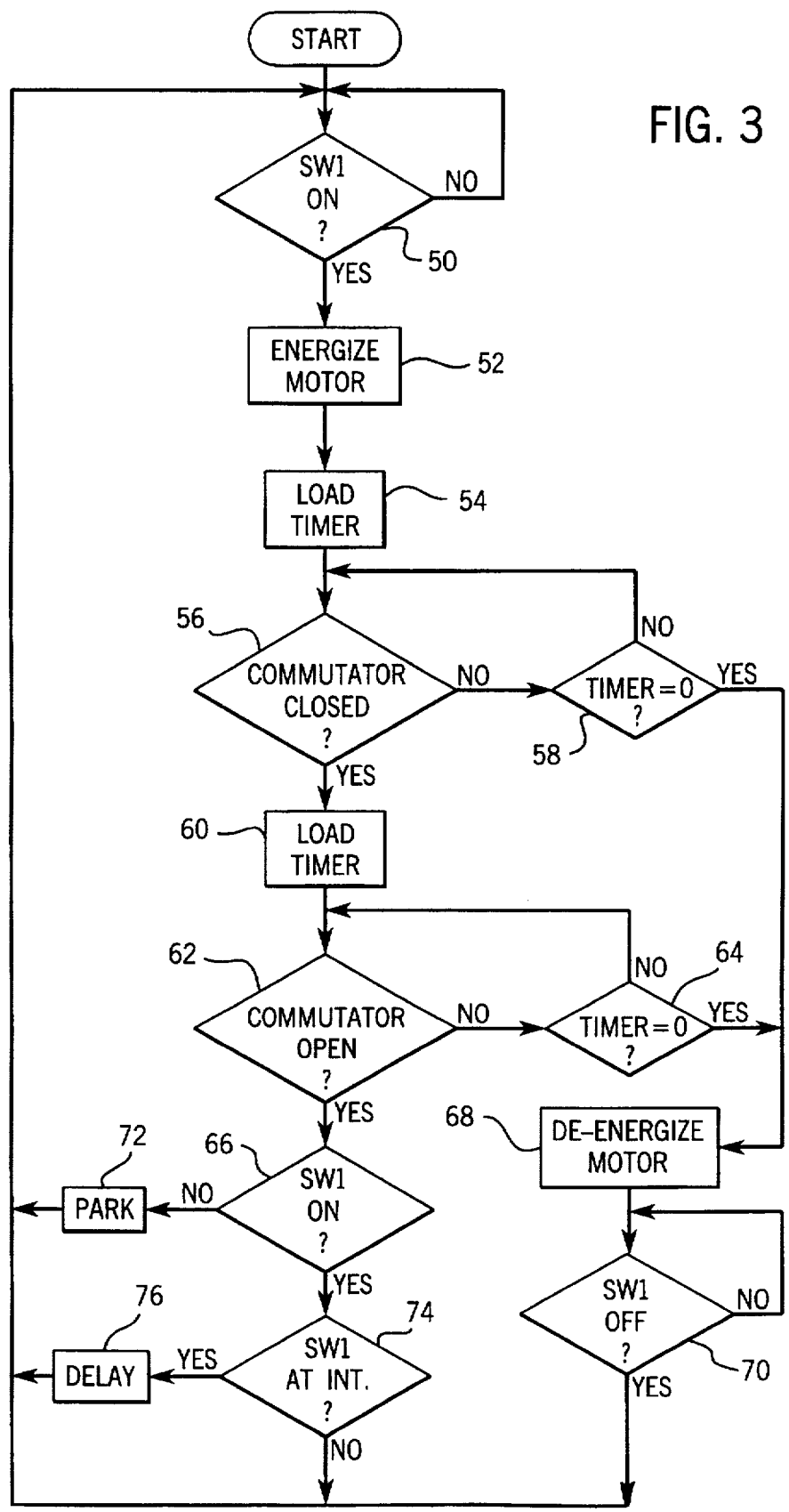
FIG. 3 is a flow chart describing the program executed by the microcontroller of FIG. 1 in controlling the wiper mechanism.

Referring now to FIG. 3 the microcontroller MC continuously executes a program which, at its first stage as indicated by decision block 50, examines the INT, OFF, HI and inputs from SW1 to test whether any of these inputs other than the OFF input has a low state such as would indicate that the INT, HI or LO modes have been chosen. If not (indicating that the OFF mode has been chosen by SW1) the program loops at decision block 50 continuously testing SW1. If, on the other hand, one of the modes other than OFF has been selected, the program proceeds to process block 52 and the microcontroller MP activates the PWR output providing power to the motor assembly and provides a HI signal output on the HI/LO output if the user has selected the HI mode with switch SW1 and a LO output on the HI/LO output of the microcontroller MC if the user has selected the LO mode.

Thus, at process block 52 the wiper mechanism is operated in a high or low speed mode as selected by the user. If the user has selected the intermittent operation at process block 52, the microcontroller MC outputs a high PWR signal and a low HI/LO signal operating the windshield wiper mechanism in the low speed mode.

Next, at process block 54, an internal timer in the microcontroller MC is loaded with a value, which, in the preferred embodiment causes the timer to time for four seconds. Generally, the timer decrements its value on a regular basis and a completion of the timing is indicated when the timer value equals zero.

The timer may be implemented as a separate circuit within the microcontroller MC or may be realized strictly in software according to techniques well known in the art. Once the timer has been loaded at process block 54 it continues to time, effectively in parallel with the additional steps of the program.

At the next step, of decision block 56, the microcontroller reads the PARK input to determine whether the commutator contacts of commutator 12 are closed such as would indicate that the wiper blade is not at the home position H.

If the commutator contacts are not closed, the program branches to decision block 58 and the timer is checked to see whether the timer value has reached zero such as would indicate four seconds have elapsed since process block 54. If not, the program branches back to the top of decision block 56 and continues to loop through decision blocks 56 and 58 until either the timer has timed out at decision block 58 or the commutator contacts open at decision block 56.

Typically when the wiper motor M has not stalled the commutator contacts will open prior to the timer timing out and the program will proceed to process block 60 where the timer is again loaded with the value that would provide for four seconds of additional timing. This loading of process block 60 erases whatever previous value was in the load timer and replaces it with the four second value. Thus, the timer is effectively started again.

After process block 60 the program proceeds to decision block 62 and the commutator contacts of commutator 12 are examined to see if they are open. If not, the program proceeds to decision block 64 and the timer is examined to see if it has timed out. If not, the program returns to process block 62. If, however, at decision block 62 the commutator contacts are open, the program proceeds to decision block 66 and ultimately, as will be described, proceeds back to decision block 50. Thus, it will be understood that the loop formed by the execution of decision blocks 56 and 62 is such as to constantly reset the timer at process blocks 54 and 60 provided the commutator contacts regularly open and close, that is if the motor M hasn't stalled.

On the other hand, if the commutator contacts stay closed or stay opened for a period of time greater than that timed by the timer (4 seconds) then at process blocks 58 and 64 the program branches to a process block 68 and the motor M is de-energized, as it is assumed that the motor must be in a stalled condition. After the motor M is de-energized by a high signal output from the microcontroller MC on the PWR line, the program proceeds to decision block 70 where SW1 is examined to see if it is in the OFF position.

Typically, in a stall condition SW1 will not be OFF but will be either in the INT, the HI or LO positions and at decision block 70 the program will loop back to the top of decision block 70 until SW1 is turned OFF by the driver in an attempt to determine why there is no power to the windshield wiper mechanism. At this point the program branches back to the top of decision block 50 and when SW1 is again turned on, the motor M may be energized at process block 50 as previously described. In this manner no special reset button is required to re-energize the motor M but the same switch (SW1) normally used to turn on the windshield wiper mechanism may be used in an intuitive manner to reactivate the motor.

Referring again to decision block 62, if the commutator contacts are open indicating in the context of the previous instructions that the motor M is not in a stall state, the program proceeds to decision block 66 and it is determined whether SW1 remains ON, a condition that might have changed since decision block 50. If is no longer ON the program proceeds to a "park" routine 72 where the commutator contacts are monitored until they become open and the motor is de-energized according to conventional logic for windshield wiper mechanisms—the only difference being that the microcontroller MC receives the PARK line directly and controls the PWR line rather than placing the commutator contacts directly in parallel with SW1.

If at decision block 66, SW1 is still ON, the program proceeds to decision block 74 and the inputs from SW1 are examined to see if the windshield wiper is operating in the intermittent mode as would be indicated by a low signal on the INT line. If not, the program branches to the top of decision block 50 and the cycle is begun again, however if SW1 indicates that the wiper is in the intermittent mode, the program proceeds to "delay" routine 76 where a timer is set to delay the program at delay block 76 for a predetermined interval. This interval may be fixed or in the preferred embodiment is determined by the interval input to the microcontroller MC receiving an analog voltage from the variable resistor VR. The range of 0 to 5 volts provided by the variable resistor will typically be mapped to a delay from 0 to along the order of 10 seconds.

At the conclusion of delay routine 76, the program proceeds to the top of decision block 50 as has been described.

Intermittent Wiper Operation

Referring now to FIG. 5, prior art windshield washer controls allow the wiper cycle to be set according to the time between activations of an on switch. For example, an on switch may be initially activated at instant 100 causing one wiper cycle 102 to occur at the same time. At an interval $D_m$ after instant 100, the switch may be activated again at instant 104 causing a corresponding wiper cycle 106. An additional wiper cycle 108 will then occur automatically at intervals $D_1$ without further activation of the on switch.

In the prior art, this interval between wiper cycles e.g., 106 and 108 may be decreased by again activating the switch at instant 110 and interval $D_2$ shorter than interval $D_1$ after the last wiper cycle, in this case 108. This new interval $D_2$ will then be used for subsequent wiper cycles.

Because the intervals $D_1$ and $D_2$ are measured with respect to a previous wiper cycle, this system makes it impossible to increase the interval between wiper cycles over its previous setting with a simple operation of the one switch. This is because if a desired interval, for example, $D_3$ longer than $D_2$ is desired, it will constantly be interrupted by wiper cycles and because the interval will be measured from that latest wiper cycle, no wiper interval longer than the current interval will be obtainable.

For this reason, the prior art proposes a separate cancel switch be used to create a cancel signal at instant 112 turning off the intermittent operation of the windshield wiper completely. If now a longer period is required, the entire sequence of on switch operation, as previously described with respect to instants 100 and 104 must be repeated. In addition, two switches are required in the prior art implementation.

In contrast, in the present invention, a single switch may be used, although that is not necessary, and the intervals between wiper cycles may be increased or decreased without canceling the intermittent operation of the windshield wiper.

Referring to FIG. 6 the on switch may be turned ON at instant 200 causing a corresponding wiper cycle 202 to occur. At an interval $D_1$ later, SW1 may be turned OFF briefly then turned ON at instant 204 causing a second wiper cycle 206 to occur. Additional wiper cycles 208 will then occur at intervals $D_1$ after earlier wiper cycles 206. During this time, SW1 remains ON. A period of time D after a wiper cycle 208 (where $D_2$ is less than $D_1$) the switch SW1 may be turned OFF briefly then ON again at an instant 210 so that wiper cycles 212 after 208 occur at intervals $D_2$ apart. If it is desired to then increase the interval between wiper cycles to a value $D_3$, then the switch SW1 may be turned OFF during a portion of an interval $D_3$ after a last wiper cycle 212 and turned ON again at the interval $D_3$ after the last wiper cycle 212 (at instant 214). By turning off SW1, interrupting wiper cycles 212 are canceled and a longer wiper cycle may be established. Future wiper cycles 216 will then be spaced by an interval $D_3$.

In this manner a single switch may be used to control the period of the wiper cycle and the period of the wiper cycling may be increased or decreased intuitively without unnecessary actuations of more than one switch.

The essence of this ability to increase the period of the wiper cycling requires that a timer counter be maintained from the last wiper cycle up to a predetermined default value regardless of whether the intermittent operation is enabled. Thus, the present invention can also be realized with two push buttons where one push button establishes a turning ON of the switch as has been described and one push button effectively turns OFF the switch. Even with this two push button situation, an increase in period of wiper activity may be accomplished by two button pressings as opposed to the three button pressings required of the prior art.

Figure 4:
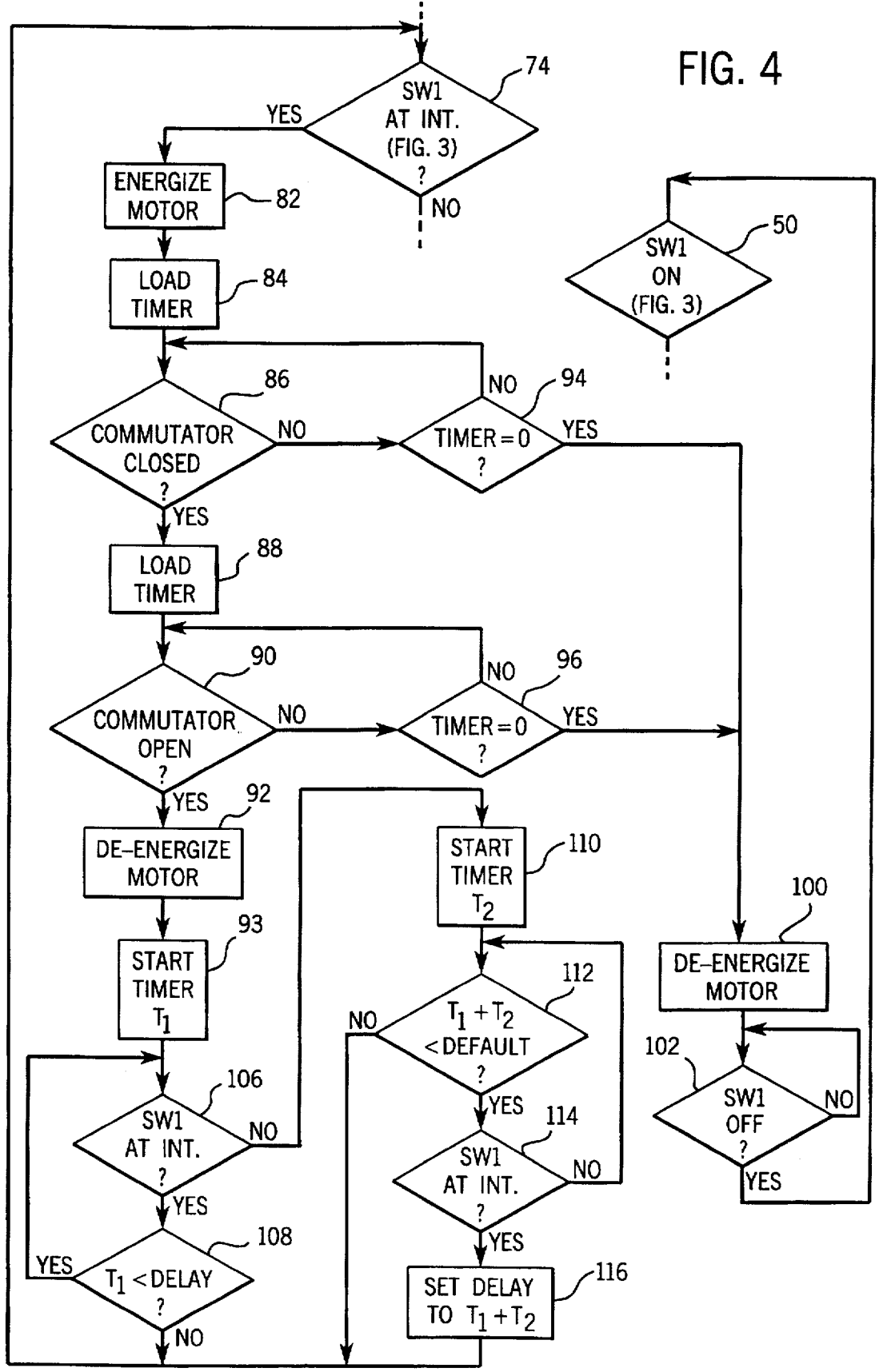
FIG. 4 is a flowchart similar to that of FIG. 3 showing an alternative embodiment of the invention where the windshield wiper is operated intermittently based on a delay value input by successive actuations of a switch input.

Referring now to FIGS. 1 and 4, the present invention realizes the above operation via additional program instructions in the microcontroller MC. Generally, the variable resistor VR of FIG. 1 and the need for an A to D converter on the microcontroller MC may be eliminated and switch SW1 may be used both to activate intermittent mode of the windshield wiper and to set the period of time between wiper cycles.

The additional program replaces the delay block 76 and starts after decision block 74 indicates that SW1 is at the INT setting. The program then proceeds to process block 82 and the wiper motor M is energized. Next, at process block 84, the timer is initialized with the default value used to detect motor stalling as described above with respect to process block 54.

The program then proceeds to process block 86 similar to process block 56 described before and the commutator contacts are checked to see if they are closed. If they are, indicating that the motor M has begun movement in a wiper cycle, the program proceeds to process block 88 and the timer is restarted with its default value, analogously to process block 60 as described above with respect to FIG. 3.

Next, at process block 90, the commutator contacts are again checked, this time to see if they have opened. If they have, the program proceeds to process block 92 as will be described below.

At process blocks 86 and 90, as was the case with process blocks 56 and 62 described above, if the commutator contacts do not close or open, the program proceeds to decision blocks 94 and 96 respectively and the timer is checked to see if it has timed out. If not, the program continues to loop back to the decision blocks 86 or 90 respectively to again wait for the change in contact state.

Normally, if the wiper motor is moving, the contact state will change as required and the program will proceed, ultimately, to process block 92 as has been mentioned. Otherwise in both decision block 94 and 96 the program proceeds to process block 100 and the wiper motor is turned off under the assumption that the motor has stalled.

Next, at decision block 102 corresponding to decision block 70 of FIG. 3, SW1 is checked to see if it is off and if not the program loops at decision block 102 back to the top of decision block 102.

Once SW1 has been turned off, to reset the motor after the stall has been corrected, the program proceeds to the top of process block 50 to see if the wiper has again been turned on.

The above described blocks 84 through 102 are generally similar to those described with respect to Fig. 3 and serve to detect motor stalling. As has been described, if the motor has not stalled, the program proceeds to process block 92.

At process block 92, the motor M which was energized at process block 82 is de-energized. Next, at process block 93 a second timer $T_1$ is set to zero and begins counting upward. This timer $T_1$ measures the time since the last wiper cycle in the intermittent mode.

Next, the program proceeds to decision block 106 to check to see if SW1 is still at INT (i.e., not been turned OFF or to LO or HI). If so, the program proceeds to decision block 108 and $T_1$ is checked to see if its value is greater than a delay time which is originally the default value of approximately 12 seconds.

If at decision block 108 $T_1$ is not greater than the delay desired between wiper cycles, the program loops back to the top of decision block 106 until the $T_1$ value is greater than the delay value.

Then the program branches back to the top of process block 50 so as to catch situations where the switch has been moved to the LO or HI position away from the INT position. Typically, if SW1 is still in INT mode, a second wiper cycle will then be initiated and the program will again find itself timing the duration between wipe cycles at decision blocks 106 and 108.

If at decision block 106 SW1 has been turned OFF indicating the user wishes to adjust the delay period, the program proceeds to process block 110 where a second timer $T_2$ is started. Next, at decision block 112, the sum of timers $T_1$ and $T_2$ are compared to the default value and as long as they are less than the default value the program proceeds back to the top of process block 50 to see if SW1 has been changed in position.

If at decision block 112 the sum of $T_1$ plus $T_2$ is still less than the default value, then the program branches to decision block 114 to see if SW1 is in the INT position again indicating that the user wants another wiper cycle. If so, at process block 116, the new value of the delay (which will be used at decision block 108 to time wiper cycles) is set to equal the sum of $T_1$ plus $T_2$. Note that the sum of $T_1$ plus $T_2$ may be less than the previous delay or greater than the previous delay, depending on when the SW1 is returned to the INT position.

At decision block 114, if SW1 is not in the INT position, the program branches back to the top of decision block 112 to continue to check $T_1$ and $T_2$ against the default value and to otherwise cause $T_2$ to continue to increase, increasing the delay between wiper cycles.

Although the preferred embodiment of the invention employs a microcontroller for the control of the wiper motor, it will be recognized to those of ordinary skill in the art from this description that the same functions may be obtained with discrete electronic circuitry, for example, by using one or more monostable multivibrators and logic gates.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

I claim:

1. A windshield wiper control comprising:
    a wiper motor for driving a windshield wiper through a wipe cycle in which the wiper moves from a first position to a second position and back to said first position;
    a sensor communicating with the motor providing a wiper motion signal indicating a position of the motor;
    a wiper switch;
    a microcontroller electrically connected to receive signals from the sensor and switch and to switchably supply electrical power to the motor, the microcontroller operating according to a stored program to:
    (a) respond to switch on signal from the switch by periodically supplying electrical power to the motor for single wipe cycle at a period substantially equal in time to the time between the occurrence of the switch on signal and a previous wipe cycle regardless of an intervening switch off signal; and
    (b) respond to the switch off signal from the switch by removing electrical power to the motor at the completion of a wipe cycle;
    whereby the period between wiper cycles may be lengthened to a desired period by providing a switch off signal at a time when a periodic wipe cycle would have occurred and then providing a switch on signal at the desired period after the previous wiper cycle.

2. The windshield wiper control of claim 1 wherein when the previous wiper cycle is greater than a predetermined default value, the microcontroller supplies electrical power to the motor for single wipe cycle at a period equal to the predetermined default value.

3. The windshield wiper control of claim 1 wherein when the switch comprises two separate pushbuttons the first providing the switch on signal when activated and the second providing the switch off signal when activated.

4. The windshield wiper control of claim 1 wherein the switch is a single rotary switch having a switch on and switch off position providing the switch on and switch off signals respectively.

5. The windshield wiper control of claim 4 wherein the switch is a single rotary switch also has high and low speed setting and wherein the microcontroller operates according to the stored program to run the windshield wipers continuously when the switch is set to the high and low settings.

6. A windshield wiper control for use with a windshield wiper system of a vehicle having a wiper motor controlled by a motor switch for driving a windshield wiper through a wipe cycle in which the windshield wiper moves from a first position to a second position and back to said first position, a sensor communicating with the motor providing a wiper motion signal indicating motion of the motor, and a wiper switch providing a wiper-on signal, the control comprising:
   an electronic circuit connected to the motor, sensor, and wiper switch to receive the motion and wiper-on signals, and for operating the motor switch to control a supply of electrical power to the motor, the electronic circuit including:
   (a) a first logic element which following the wiper-on signal by activating the motor switch to supply electrical power to the motor; and
   (b) a second logic element, which in response to the first logic element supplying electrical power to the motor, deactivates the motor switch to remove electrical power to the motor in a first instance when the wiper-on signal is no longer present and in a second instance when the wiper-on signal is present and the wiper motion signal is no longer present.

7. The windshield wiper control of claim 6 wherein the electronic circuit is a programmable microcontroller.

8. The windshield wiper control of claim 6 wherein the sensor is a rotary switch connected to the wiper motor and provides a set of contacts which open and close with rotation of the wiper motor to provide a high and low voltage signal as the motion signal.

9. The windshield wiper control of claim 6 wherein the electronic circuit further includes a timer coupled to the second logic element; and wherein the second logic element in the second instance removes electrical power to the motor when the wiper-on signal is present and the wiper motion signal is no longer present for a predetermined amount of time as indicated by the timer.

10. The windshield wiper control of claim 9 wherein the predetermined amount of time is selected to be greater than a first amount of time required for a wipe cycle, and less than a second amount of time in which damage would occur to the motor when stalled.

11. The windshield wiper control of claim 9 wherein the predetermined amount of time is selected to be greater than an amount time required for a driver to move from within the vehicle to a position outside the vehicle with access to the windshield wiper.

12. The windshield wiper control of claim 6 wherein the electronic circuit further includes a circuit element, which after deactivation of the motor switch by the second logic element, reactivates the motor switch to restore electrical power to the motor when the wiper-on signal is removed and then reasserted.

13. The windshield wiper control of claim 6 wherein the motion signal from the wiper indicates whether the wiper is in the first position; and wherein the second logic element deactivates the motor switch when the wiper-on signal is no longer present only after the wiper moves back to the first position.

14. The windshield wiper control of claim 6 wherein the electronic circuit further includes a mechanism which periodically activates and deactivates the motor switch to remove power from and restore power to the motor thereby operating the wiper on an intermittent basis.

15. The windshield wiper control of claim 14 including in addition a potentiometer providing a variable voltage signal to the electronic circuit; and wherein, in response to the variable voltage signal, the electronic circuit adjusts a frequency at which the mechanism periodically activates and deactivates the motor switch.

* * * * *